United States Patent
Fleury et al.

(10) Patent No.: US 6,483,455 B2
(45) Date of Patent: Nov. 19, 2002

(54) DEVICE FOR THE UNAMBIGUOUS MEASUREMENT OF THE ROLL OF A PROJECTILE AND APPLICATION TO THE CORRECTION OF THE PATH OF A PROJECTILE

(75) Inventors: Sylvie Fleury, Vincennes (FR); Louis Beaulieu, Guyancourt (FR)

(73) Assignee: Thomson-CSF, Paris (FR)

(*) Notice: Subject to any disclaimer, the term of this patent is extended or adjusted under 35 U.S.C. 154(b) by 0 days.

(21) Appl. No.: 09/729,837

(22) Filed: Dec. 6, 2000

(65) Prior Publication Data

US 2001/0004247 A1 Jun. 21, 2001

(30) Foreign Application Priority Data

Dec. 15, 1999 (FR) .............................................. 99 15839

(51) Int. Cl.[7] ........................... G01S 13/66; G01S 13/00
(52) U.S. Cl. ............................. 342/62; 342/5; 342/175; 342/188; 342/195; 244/3.1; 244/3.11; 244/3.14; 244/3.21; 244/3.22
(58) Field of Search ............................. 342/5, 6, 7, 61, 342/62, 104, 105, 175, 188, 195; 244/3.1, 3.11, 3.21, 3.22, 3.23, 3.14, 3.12, 3.13

(56) References Cited

U.S. PATENT DOCUMENTS

| | | | |
|---|---|---|---|
| 4,750,689 A | * 6/1988 | Yff | ........................... 244/3.14 |
| 4,873,571 A | 10/1989 | Balet et al. | |
| 4,967,981 A | * 11/1990 | Yff | ........................... 244/3.21 |
| 4,979,696 A | * 12/1990 | Yff | ........................... 244/3.14 |
| 5,039,029 A | 8/1991 | Taylor et al. | |
| 5,372,334 A | * 12/1994 | Cuadros | ..................... 244/3.11 |
| 5,414,430 A | * 5/1995 | Hansen | ........................ 342/188 |
| 5,490,643 A | 2/1996 | Jano et al. | |
| 5,583,508 A | * 12/1996 | Pugh et al. | .................... 342/62 |
| 6,016,990 A | * 1/2000 | Small | ......................... 244/3.11 |

FOREIGN PATENT DOCUMENTS

| | | |
|---|---|---|
| EP | 0 343 131 A | 11/1989 |
| GB | 2 302 224 A | 1/1997 |
| NL | 8 501 616 A | 1/1987 |

* cited by examiner

*Primary Examiner*—Bernarr E. Gregory
(74) *Attorney, Agent, or Firm*—Oblon, Spivak, McClelland, Maier & Neustadt, P.C.

(57) ABSTRACT

A device for the unambiguous measurement of the angle of roll of a projectile, comprises at least a radar equipped with means of processing and sending a signal to the casing of the projectile in at least one direction of incident polarization; a set of parallel grooves made on the casing, the depth of which is modulated dissymmetrically with respect to the axis of symmetry of the projectile; the axis of symmetry of the projectile not passing through the point of the antenna of the radar where the antenna beam is generated, the processing means analyzing, in reception, a signal back-scattered by the casing of the projectile, the signal being modulated as a function of the angle of roll of the projectile, the modulation having two maximum local values corresponding to two angular roll positions of the projectile such that the polarization $\vec{E}$ is parallel to the grooves, the processing means removing the 180° ambiguity by comparing the levels of the local maximum values. The device can be applied especially to the correction of the paths of projectiles fired by a gun and when the correction requires knowledge of the roll position of the projectiles.

20 Claims, 3 Drawing Sheets

DEVICE FOR THE UNAMBIGUOUS MEASUREMENT OF THE ROLL OF A PROJECTILE AND APPLICATION TO THE CORRECTION OF THE PATH OF A PROJECTILE

BACKGROUND OF THE INVENTION

1. Field of the Invention

The present invention relates to a device for the unambiguous measurement of the roll of a projectile and its application to the correction of he path of the projectile. It can be applied especially to the correction of the paths of projectiles fired by a gun and when the correction requires knowledge of the roll position of the projectiles.

To guide a projectile or a missile in flight, it is necessary to act judiciously on its driving devices such as the rudders, impellers or gas jets. If we consider for example the action of a side impeller incorporated into the projectile and designed to correct its path, it will be necessary to control the impellers at the right time, namely when the situation of the impeller is such that its action will guide the projectile in the right direction. Since the position of the impeller is perfectly defined with respect to the projectile, it is enough to know the roll position of this projectile. In other words, it is enough to know the orientation of the projectile with respect to the plane passing through a horizontal or vertical axis of the projectile and its longitudinal axis, namely the roll angle of this projectile.

2. Description of the Prior Art

There are prior art approaches used to find out the roll of a projectile either at the time of blast-off or during the flight phase. A first approach for measuring the roll of a projectile consists especially in acquiring this information when the projectile leaves the mouth of the gun. The projectile contains a magnetic component whose magnetic field vector is known. At the exit from the gun, two windings are positioned in such a way that a voltage is induced when the projectile leaves the gun. A computation unit uses this induced voltage to know the roll at the starting point of the flight phase. This approach is described especially in the patent application EP 0451122. The use of such a device nevertheless assumes precise knowledge of the law of variation of the rotational speed in roll during the flight phase. It is not generally possible to have this knowledge.

Another approach, described for example in the U.S. Pat. No. 5,039,029 consists in observing the characteristics of one or more signals sent out by the projectile. By transmitting a linearly polarized signal to the ground, the plane of transmission with respect to the geometry of the missile can be identified. This is possible at the ground by comparing the levels received in two orthogonal polarizations. However, a 180-degree ambiguity remains. To resolve this ambiguity, the projectile has an antenna array that may be driven in phase so as to generate a roll modulation. Signals of different levels are obtained for two directions spaced out by 180° in the previously identified plane. This approach however has the drawback of requiring active components on board the projectile. The result thereof is a problem of cost as well as a problem of reliability because these components are not generally in a position to withstand the levels of acceleration imposed on the projectile without suffering damage.

The above approaches either do not measure the roll during the flight phase or require the incorporation of electronic components into the projectile. For reasons of reliability and cost in particular, it is preferable to implement an approach that does not bring active elements into play in the projectile and at the same time enables the measurement of the roll of the projectile. A passive approach of this kind can be devised on the basis of a simple radar observation.

Conventionally, a radar illuminates the projectile according to a given polarization, the signal back-scattered by the projectile being analyzed according to the same polarization as that used at transmission. Thus used, the radar gives only the position of the projectile. When the projectile is in rotation, no information about its roll position can be accessed since it substantially has a symmetry of revolution. Furthermore, this geometry of revolution generates no depolarization which it might be sought to exploit in order to acquire information relating for example to the sighting line pertaining to the axis of the projectile. For the projectile to have a signature dependent on its roll, it is necessary to modify the geometry thereof in such a way that, when illuminated by a radar wave, the amplitude of the back-scattered field depends on its roll. A geometrical solution may consist in incorporating appropriately sized grooves embedded in the rear casing of the projectile. These grooves constitute elements for which the back-scattered field depends highly on the incident polarization, the polarization of the radar being fixed. The dependence on the incident polarization results from the orientation of the grooves which are themselves in rotation because they form part of the projectile. This approach has the advantage of not requiring any active components on the projectile. However, it has a drawback of giving a measurement of the roll angle only to nearest value of $\pi$. There is therefore an 180° ambiguity of measurement. Indeed, a groove is parallel to the direction of polarization of the electromagnetic field sent by the radar for an angle of roll of the projectile to the nearest value of $\pi$.

One aim of the invention especially is to overcome this drawback and therefore obtain an unambiguous measurement of the angle of roll of a projectile without having active components integrated into this projectile.

SUMMARY OF THE INVENTION

To this end, an object of the invention is a device for the measurement of the angle of roll of a projectile, comprising at least:

- a radar equipped with means of processing and sending a signal to the casing of the projectile in at least one direction of incident polarization $\overline{E}$;
- a set of parallel grooves made on the casing, the depth of which is modulated dissymmetrically with respect to the axis of symmetry of the projectile;
- the axis of symmetry of the projectile not passing through the point of the antenna of the radar where the antenna beam is generated, the processing means analyzing, in reception, a signal back-scattered by the casing of the projectile, the signal being modulated as a function of the angle of roll of the projectile, the modulation having two maximum local values corresponding to two angular roll positions of the projectile such that the polarization $\overline{E}$ is parallel to the grooves, the processing means removing the 180° ambiguity by comparing the levels of the local maximum values.

In a particular embodiment, the depth of the grooves goes on increasing.

The main advantages of the invention are that it increases the reliability of measurement of the roll and is simple to implement and economical.

BRIEF DESCRIPTION OF THE DRAWINGS

Other features and advantages of the invention shall appear from the following description made with reference to the appended drawings, of which.

MORE DETAILED DESCRIPTION

Figure 1:
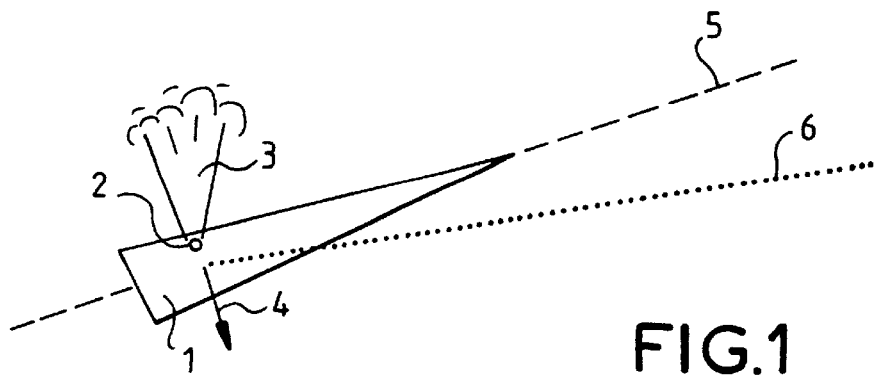
FIG. 1 shows a guided projectile with its path-changing means.

FIG. 1 gives a schematic view of a projectile 1 guided by path-changing means 2. The projectile 1 is ejected from a gun with a rotational roll motion. The path-changing means 2 are for example a side impeller consisting of a lateral gas-ejection hole 3. The impeller may be coupled to a gas generator integrated into the projectile by means of a valve opened by pulses under the control of a driving device that responds to commands transmitted for example by radar or laser pulses. Upon command, the valve, during a very short period of time, allows a blast of propulsion gases into the side ejection orifice. This gives rise to a lateral shift of the projectile 1 which is deflected in the direction 4 where the blast of gas has occurred and leaves its former path 5 to take a new path 6. Of course, to be able to use the side impeller or impellers judiciously, it is necessary to know the angle of roll of the projectile 1 at all times.

As indicated here above, one way to avoid the integration of active components on board the projectile 1 in order to know its roll is to use radar techniques. The radar illuminates the projectile 1 according to a given polarization and the signal back-scattered by the projectile is analyzed according to the same polarization as the one at transmission. Since the projectile substantially has a symmetry of revolution, no indication on its roll can be accessed without a specific modification of its geometry.

Figure 2:
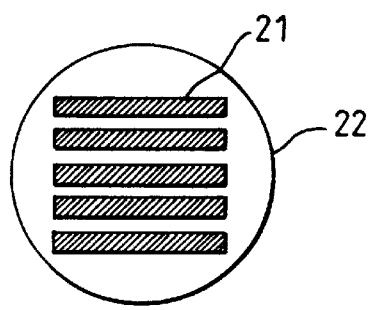
FIG. 2 shows an exemplary embodiment of grooves on the casing of a projectile.

FIG. 2 shows a modification of the geometry of a projectile giving it a signature that depends on its roll in such a way that, when the projectile is illuminated by a radar wave, the amplitude of the back-scattered field depends on its roll. To this end, parallel grooves 21 are made on the rear casing 22 of the projectile. These grooves are elements for which the back-scattered field depends greatly on the incident polarization. Since the polarization of the radar is fixed, the dependence on the incident polarization results from the orientation of the grooves which are themselves in rotation because they form part of the projectile. More specifically, grooves oriented perpendicularly to the incident polarization have little effect on the signature $\sigma_x$ of the rear casing for observation with the same polarization. This is no longer the case for polarization parallel to the grooves 21. In this case, a guided wave is generated inside these grooves and then returns in a state where it is phase-shifted with respect to the contribution of the non-grooved part of the casing. The combination of these two contributions, that of the grooves and that of the non-grooved part, prompts a modulation of the total signal back-scattered by the casing of the projectile.

A simple mathematical model shows the modulations observed for the two signals. $C_i$ designates the signal back-scattered in parallel to the incident polarization received by the radar and $X_i$ designates the crossed polarization signal, namely the signal perpendicular to the incident polarization for a roll angle $\Phi_i$. The roll angle equal to 0° corresponds for example to a polarization perpendicular to the grooves. The signals $C_i$ and $X_i$ as a function of the roll angle $\Phi_i$ are given by the following relationships:

$$C_i = A[1-(\cos(\Phi_i))^2] \quad (1)$$

$$X_i = B\sin(\Phi_i)\cos(\Phi_i) \quad (2)$$

Where A and B are arbitrary constants.

If the geometry of the grooves is carefully chosen, then the signature of the grooves in perpendicular polarization is close to that of the rest of the casing.

Figure 3:
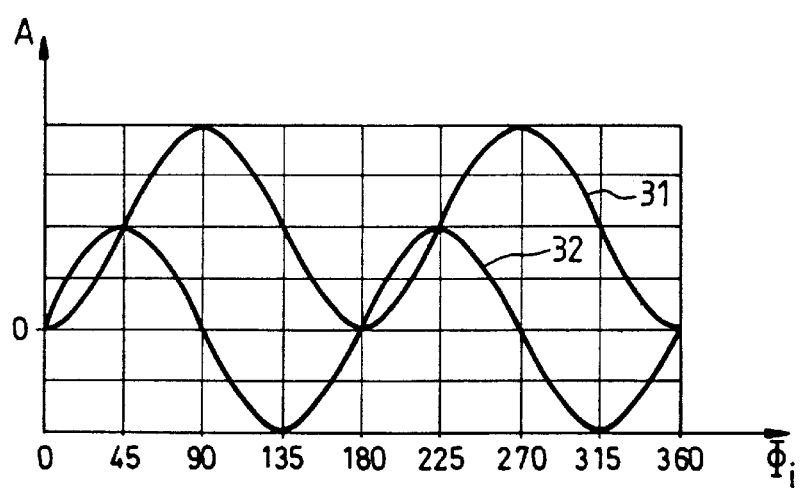
FIG. 3 shows a curve of modulation of the amplitude of a radar signal back-scattered by a grooved casing as a function of the roll.

FIG. 3 illustrates the form of the signals $C_i$ and $X_i$ respectively by a first curve 31 and a second curve 32 in a system of axes where the x-axis represents the values of the roll angle $\Phi_i$ between 0° and 360° and the y-axis represents the amplitudes of the two signals. The form of these signals as a function of the roll angle shows the modulation referred to here above. For example, the curve 31 shows that the signal $C_i$, parallel to the incident polarization, is the minimum when the grooves are perpendicular to the incident polarization corresponding to a roll angle $\Phi_i$ taken to be equal to 0° and that it is the maximum when the grooves are parallel to the incident polarization, corresponding to a roll angle equal to 90°. If we overlook the propagation time of the radar signals with respect to the rotational speed of the projectile, the curve 31 shows therefore that the roll angle $\Phi_i$ can be defined with respect to the direction of the incident polarization. However, the result obtained is unfortunately vitiated by an ambiguity. The measurement of the roll thus obtained is accurate to within 180°. The minimum values of the modulation curve 31 are indeed spaced out by 180°. This ambiguity of $\sigma$ is also deduced from the relationship (1) which is a function of the square cosine $(\cos(\Phi_i))^2$ of the roll angle $\Phi_i$. Indeed $\Phi_i$ and $\Phi_i+\sigma$ give the same signal $C_i$.

It is an object of the invention especially to unambiguously determine the roll of the projectile. According to the invention, to remove the ambiguity, the casing of the projectile is observed by the radar in such a way that the axis of symmetry of the projectile does not meet the axis of the antenna beam on the radar, and the casing has grooves, the depth of the grooves being modulated.

Figure 4A:
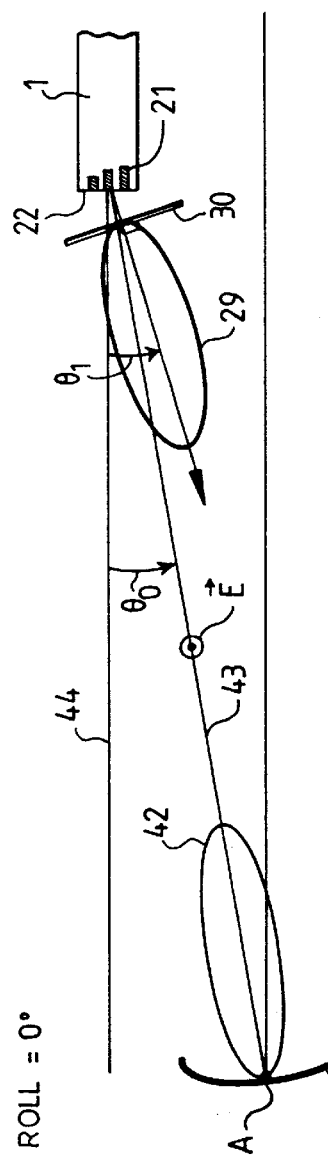
FIGS. 4a and 4b show an exemplary embodiment of a device according to the invention for the measurements of roll of a projectile, the roll angles being offset by 180°.
Figure 4B:
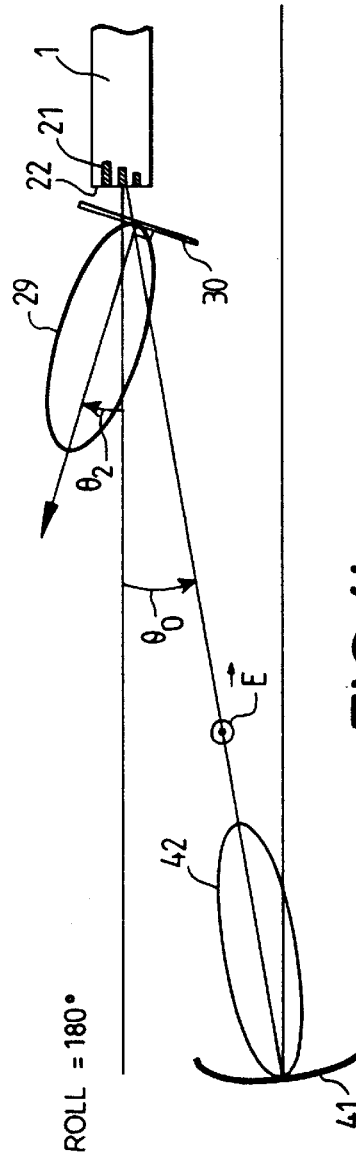

FIGS. 4a and 4b therefore illustrate a possible embodiment of a device according to the invention and its application for two measurements of roll angles of a projectile 1 that are spaced out by 180°. The casing of the projectile is provided with parallel grooves 21. A radar represented by its antenna 41 illuminates the casing 22 of the projectile 1. According to the invention, the axis of symmetry 44 of the projectile does not go through the radar position, namely through the point A of the antenna in which the antenna beam 42 is generated. The axis of symmetry 44 of the projectile therefore forms an angle $\theta_0$ with the axis 43 of the beam. Furthermore, the depth of the grooves 21 of the casing is modulated dissymmetrically with respect to the axis 44 of the projectile. Thus, the depth of the grooves increases for example from one peripheral groove to the next. Preferably, these grooves intersect linearly.

The phase of the signal of the reflected wave inside a groove 21 depends on the electrical length of this groove and therefore its depth. The signals coming out of each of the grooves therefore have one and the same amplitudes but different phases. In the embodiment shown in FIGS. 4a and 4b, the phase varies linearly. The summing up of the contributions of each of the grooves generates a response 29 whose maximum is offset by an angle $\theta_1$, $\theta_2$ with respect to the axis of symmetry 44 of the projectile, normal to the casing, in the plane containing the axis of symmetry 44 of the projectile and the direction perpendicular to the grooves 21. This plane is the plane of the FIGS. 4*a* and 4*b*. In the exemplary embodiment illustrated by these figures, the phase plane 30 of the back-scattered wave is parallel to the straight line going through the bottoms of the grooves, namely the straight line representing the modulation of these grooves.

Referring to FIG. 4*a*, it is seen that the normal to the phase plane 30 forms an angle $\theta_1$ with the axis of symmetry 44 of the projectile. As an example, this figure corresponds to a roll angle $\Phi_i$, taken to be equal to 0°, for an incident polarization $\overline{E}$ parallel to the grooves. FIG. 4*b* shows the projectile in a roll position offset by 180°. The incident polarization $\overline{E}$ is still parallel to the grooves but, in this case, the normal to the phase plane 30 forms an angle $\theta_2$ with the axis of the projectile. $\theta_2$ here is equal to $-\theta_1$.

Figure 5:
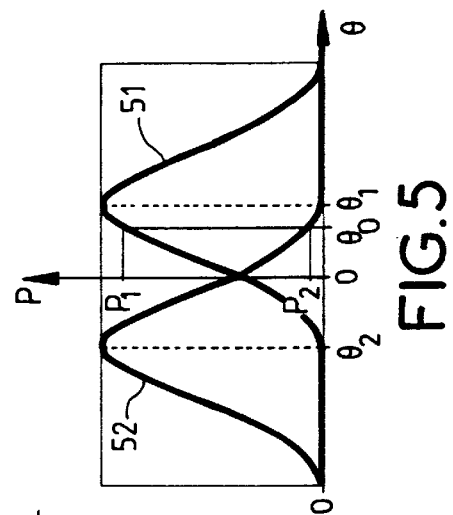
FIG. 5 illustrates the working of a device according to the invention to remove the ambiguity of the measurement.

FIG. 5 shows the way in which the ambiguity is removed by illustrating the conjugated effect of an observation offset by the angle $\theta_0$ with respect to the axis of symmetry 44 of the projectile and the dissymmetrical modulation of the depth of the grooves. More particularly, FIG. 5 uses two curves to show the power P of the back-scattered signal as a function of the angle $\theta$ made by the axis of symmetry 44 of the projectile with the axis 43 of the antenna beam 42 for the two roll positions illustrated by FIGS. 4*a* and 4*b*.

A first curve 51 therefore represents the power of the signal back-scattered by the casing as a function of the angle $\theta$ in the case of FIG. 4*a*, namely in the case where the normal to the phase plane is offset by $\theta_1$. The roll position of the projectile of FIG. 4*a* is assumed to correspond, by way of an example, to the roll angle $\Phi_1$ equal to 0°. The maximum power corresponds to the angle $\theta^1$. The curve 51, assumed to be Gaussian, is symmetrical with respect to this angle. Symmetrically, a second curve 52 represents the power of the back-scattered signal as a function of the angle $\theta$ in the case where the roll angle $\Phi_1$ is offset by 180° as illustrated by FIG. 4*b*. This curve 52 is symmetrical with the angle $\theta_2$, itself equal to $-\theta_1$.

In the direction of radar observation $\theta_0$, the power back-scattered has a level equal to P1 for the roll angle $\Phi_i$ equal to 0°, the level being defined by the first curve 51, and a level P2 for a roll angle $\Phi_i$ equal to 180°, the level defined by the second curve 52. FIG. 5 shows that these two levels P1, P2 can be substantially different. If we know for example the modulation of depth of the grooves, we can remove the ambiguity in the measurement of the roll. In the exemplary roll positions of FIGS. 4*a* and 4*b*, the maximum power between the two levels P1 and P2 corresponds to the position of FIG. 4*a* where the roll is chosen to be equal to 0°.

Figure 6:
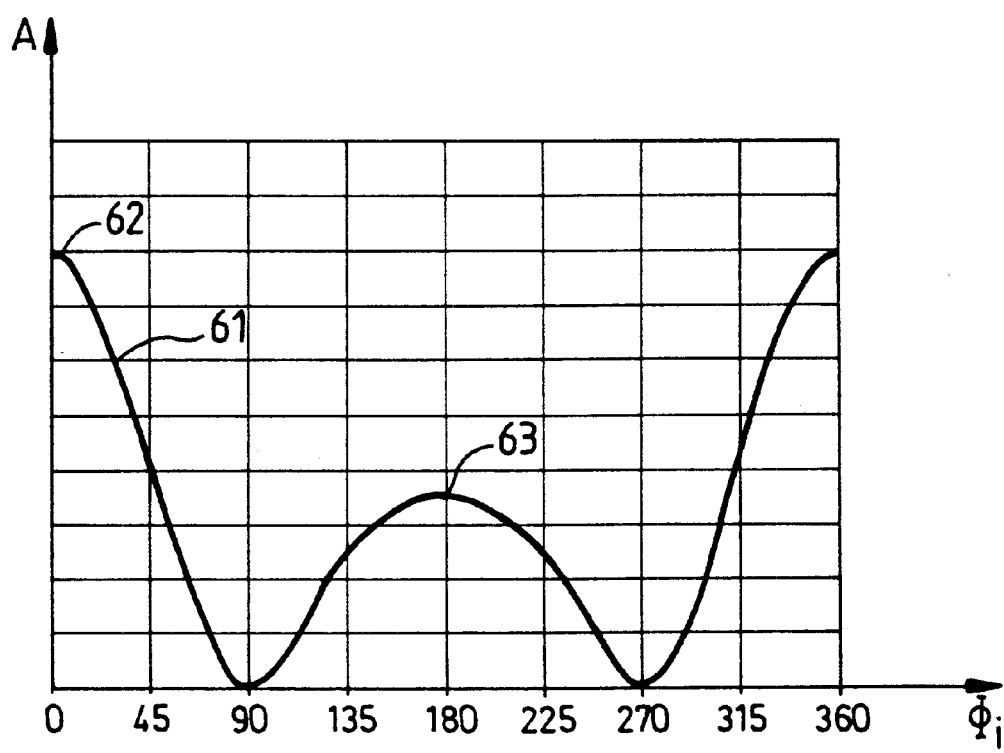
FIG. 6 shows a curve of modulation of the amplitude of the back-scattered signal as a function of the roll, enabling the removal of the ambiguity by comparison with local maximum values.

In FIG. 6, a curve 61 illustrates the amplitude modulation A of the signal received, namely the signal analyzed at the radar in reception. This signal is analyzed by processing means associated with the radar. This modulation 61 is represented as a function of the angle of roll $\Phi_i$ of the projectile. It has two local maximum values 62, 63 between 0° and 360°. These two maximum values correspond to roll positions of the projectile such that the polarization $\overline{E}$ is parallel to the grooves 21 of the casing. If we keep the reference taken as an example for FIGS. 4*a* and 4*b*, the biggest of the two maximum values of amplitude corresponds to the angle 0° while the smallest of the two maximum values corresponds to the angle 180°.

A device according to the invention has at least one radar 41 sending a signal polarized in at least one direction and grooves 21, for example machines in the casing of the projectile, with a depth modulated dissymmetrically with respect to the axis 44 of the projectile. This axis 44 is furthermore offset by an angle $\theta_0$ with respect to the axis 43 of the antenna beam 42 of the radar.

As shown in FIG. 3, grooves are used by radar processing means to determine the angle of roll of the projectile to within 180°. In fact, these means may determine the spatial position of a plane containing, for example, the axis 44 of the projectile and the direction perpendicular to the grooves. This position is defined with respect to the incident polarization $\overline{E}$ of the wave sent by the radar.

Once we know how to locate this plane in space, there still remains an ambiguity of 180° in defining the starting roll position with respect to the polarization $\overline{E}$. Owing to the angular offset of the axis 44 of the projectile with respect to the axis 43 of the antenna and the modulation in depth of the grooves, it is possible to remove the ambiguity by analyzing the local maximum values 62, 63 of the modulation curve 61 of FIG. 6. The processing means of the radar then compare the levels of signals received in a plane orthogonal to the antenna axis 43 in two roll directions spaced out by 180°. These directions are parallel to the above-mentioned plane. From the modulation curve 61 of FIG. 6, it can be concluded for example that the signal with the greatest amplitude corresponds to the roll angle 0°.

To improve the measurement of the roll angle, the reception signal can be analyzed, for example, in two orthogonal polarizations.

If we know for example the lateral position of the impeller 2 with respect to the grooves, the determining of the roll angle or, more particularly, the determining of the position of the grooves with respect to the known direction of the incident polarization $\overline{E}$ is used to control the impeller at the right time as a function of the path correction planned.

A device according to the invention has high reliability since it is entirely passive on the projectile. It is furthermore simple to make and does not require any particularly complicated or costly components.

What is claimed is:

1. A device for measurement of angle of roll of a projectile, comprising:

a radar equipped with means of processing and sending a signal to a casing of the projectile in at least one direction of incident polarization; and a set of parallel grooves made on the casing having depths modulated dissymmetrically with respect to an axis of symmetry of the projectile;

the axis of symmetry of the projectile not passing through a point of an antenna of the radar where the antenna beam is generated; and wherein the processing means is configured for analyzing, in reception, a signal back-scattered by the casing of the projectile, the signal being modulated as a function of the angle of roll of the projectile, the modulation having two maximum local values corresponding to two angular roll positions of the projectile such that the polarization is parallel to the grooves, the processing means removing a 180° ambiguity by comparing levels of the local maximum values.

2. A device according to claim 1, wherein the depth of the grooves increases from one peripheral groove to another peripheral groove.

3. A device according to claim 2, wherein the depth of the grooves increases linearly.

4. A device according to claim 1, wherein a reference angle of roll corresponds to the maximum value with a highest of the levels.

5. A device according to claim 4, wherein the reference angle is taken to be a starting angle 0°.

6. A device according to claim 1, wherein the signal received is analyzed according to two orthogonal polarizations.

7. A device according to claim 1, wherein the grooves are machined on the casing.

8. A device according to claim 1, further comprising a means for providing a correction path of the projectile, wherein the projectile further comprises:
   a side impeller, wherein the impeller is controlled as a function of the angle of roll measured by the device;
   wherein the grooves are modulated in depth on a casing of the projectile.

9. A radar system for measuring an angle of roll of a projectile, the radar system comprising:
   a radar transmitter for transmitting a radar signal according to a given polarization, the radar signal being directed to illuminate at least a portion of the projectile having a signature which varies with the angle of roll of the projectile;
   a radar receiver for receiving a return signal back-scattered from the projectile, the return signal being modulated by the portion of the projectile as a function of the angle of roll of the projectile to have two maximum local values respectively corresponding to two positions of the angle of roll of the projectile; and
   a radar processor for analyzing the return signal and determining the angle of roll of the projectile based on levels of the two maximum local values.

10. A radar system according to claim 9, wherein the radar processor removes a 180° ambiguity by comparing the levels of the two maximum local values.

11. A radar system according to claim 9, wherein the portion of the projectile having a signature which varies with the angle of roll comprises:
   a set of parallel grooves on a casing of the projectile, wherein depths of respective ones of the set of parallel grooves are modulated dissymmetrically with respect to an axis of symmetry of the projectile.

12. A radar system according to claim 11, wherein a first peripheral groove of the set of parallel grooves has a minimum depth and a second peripheral groove opposite the first peripheral groove has a maximum depth and the depths of adjacent ones of the set of parallel grooves increases from the first peripheral groove to the second peripheral groove.

13. A radar system according to claim 11, wherein the set of parallel grooves are machined on the casing.

14. A radar system according to claim 9, wherein the projectile further comprises:
   a side impeller configured to be controlled as a function of the angle of roll of the projectile determined by the radar processing means.

15. A method of measuring an angle of roll of a projectile using a radar system, the method comprising:
   transmitting, from the radar system, a radar signal with a given polarization to illuminate at least a portion of the projectile, wherein the projectile has a signature which varies with the angle of roll of the projectile;
   receiving, at the radar system, a return signal back-scattered from the projectile, the return signal being modulated by the portion of the projectile as a function of the angle of roll of the projectile to have two maximum local values respectively corresponding to two positions of the angle of roll of the projectile; and
   processing the return signal to determine the angle of roll of the projectile based on levels of the two maximum local values.

16. A method according to claim 15, further comprising:
   comparing the levels of the two maximum local values to remove a 180° ambiguity.

17. A method according to claim 15, further comprising:
   providing, on a casing of the projectile, a set of parallel grooves on of the projectile, wherein depths of respective ones of the set of parallel grooves are modulated dissymmetrically with respect to an axis of symmetry of the projectile.

18. A method according to claim 17, wherein a first peripheral groove of the set of parallel grooves has a minimum depth and a second peripheral groove opposite the first peripheral groove has a maximum depth and the depths of adjacent ones of the set of parallel grooves increases from the first peripheral groove to the second peripheral groove.

19. A method according to claim 17, further comprising:
   machining the set of parallel grooves on the casing.

20. A method according to claim 15, further comprising:
   controlling the projectile using a side impeller, the projectile being controlled as a function of the angle of roll of the projectile determined by the radar processing means.

* * * * *